United States Patent
Uehara

(10) Patent No.: US 12,276,314 B2
(45) Date of Patent: Apr. 15, 2025

(54) TORQUE LIMITER

(71) Applicant: EXEDY Corporation, Neyagawa (JP)

(72) Inventor: Hiroshi Uehara, Neyagawa (JP)

(73) Assignee: EXEDY Corporation, Osaka (JP)

( * ) Notice: Subject to any disclaimer, the term of this patent is extended or adjusted under 35 U.S.C. 154(b) by 458 days.

(21) Appl. No.: 17/856,129

(22) Filed: Jul. 1, 2022

(65) Prior Publication Data

US 2023/0036835 A1 Feb. 2, 2023

(30) Foreign Application Priority Data

Aug. 2, 2021 (JP) ................... 2021-126816

(51) Int. Cl.
*F16D 7/02* (2006.01)
*F16F 15/129* (2006.01)
*F16D 3/12* (2006.01)

(52) U.S. Cl.
CPC .......... *F16D 7/025* (2013.01); *F16F 15/1297* (2013.01); *F16D 3/12* (2013.01); *F16D 2300/10* (2013.01); *F16D 2300/22* (2013.01)

(58) Field of Classification Search
CPC ........ F16D 7/025; F16D 3/12; F16D 2300/10; F16D 2300/22; F16F 15/1297
USPC ............................ 464/46; 192/107 R, 113.22
See application file for complete search history.

(56) References Cited

U.S. PATENT DOCUMENTS 8,398,491 B2 * 3/2013 Saeki ..................... F16D 13/70
464/46

FOREIGN PATENT DOCUMENTS

| JP | 2005127507 A | 5/2005 |
|----|--------------|--------|
| JP | 2010065750 A | 3/2010 |
| JP | 2010286043 A | 12/2010 |
| JP | 2011-226572 A | 11/2011 |
| JP | 2021076226 A | 5/2021 |
| WO | 2020084154 A2 | 4/2020 |

OTHER PUBLICATIONS

Notice of Allowance dated Jan. 24, 2025, issued in connection with corresponding Japanese patent application (3 pages).

* cited by examiner

*Primary Examiner* — Greg Binda
(74) *Attorney, Agent, or Firm* — United IP Counselors, LLC

(57) ABSTRACT

A torque limiter includes a friction mechanism, a pressure plate, a first side plate, an urging member, and a second side plate. The friction mechanism includes a first friction member and a second friction member. The pressure plate includes a first contact surface and a plurality of first drainage grooves. The first contact surface is a surface that makes contact with the first friction member. The first drainage grooves radially extend. The second side plate includes a second contact surface that makes contact with the second friction member. The second side plate is disposed on a second side with respect to the second friction member in an axial direction. The second side plate is attached to the first side plate to be unitarily rotated therewith.

4 Claims, 8 Drawing Sheets

TORQUE LIMITER

CROSS-REFERENCE TO RELATED APPLICATIONS

This application claims priority to Japanese Patent Application No. 2021-126816 filed Aug. 2, 2021. The entire contents of that application are incorporated by reference herein in their entirety.

TECHNICAL FIELD

The present invention relates to a torque limiter.

BACKGROUND ART

A type of hybrid vehicle including an engine and an electric motor, for instance, uses such a torque limiter as described in Japan Laid-open Patent Application Publication No. 2011-226572 in order to prevent transmission of an excessive torque from an output side to an engine side in engine start and so forth.

The torque limiter described in Japan Laid-open Patent Application Publication No. 2011-226572 includes a cover plate, a pressure plate, and a friction disc. The friction disc is provided with a friction member fixed thereto. The pressure plate is urged by a cone spring to press the friction member.

In the torque limiter configured as described above, the pressure plate and the friction member are in close contact; hence, chances are that water accumulates on the inner peripheral surface of the friction member. When water thus accumulates on the inner peripheral surface of the friction member, the accumulating water permeates the surface of the friction member. This results in a drawback that characteristics of the friction member become unstable.

In view of the above, it is an object of the present invention to stabilize friction characteristics of a friction member by making it difficult for water to accumulate on the inner peripheral surface of the friction member.

BRIEF SUMMARY

A torque limiter according to a first aspect of the present invention includes a friction mechanism, a pressure plate, a first side plate, an urging member, and a second side plate. The friction mechanism includes a first friction member and a second friction member. The first friction member has an annular shape. The second friction member is disposed on a second side with respect to the first friction member in an axial direction. The second friction member has an annular shape. The pressure plate has an annular shape. The pressure plate includes a first contact surface and a plurality of first drainage grooves. The first contact surface is a surface making contact with the first friction member. The plurality of first drainage grooves are disposed on the first contact surface to be apart from each other at intervals in a circumferential direction. The plurality of first drainage grooves radially extend. The pressure plate is disposed on a first side with respect to the first friction member in the axial direction. The first side plate is disposed on the first side with respect to the pressure plate in the axial direction. The urging member is disposed between the pressure plate and the first side plate. The urging member urges the pressure plate to the second side in the axial direction. The second side plate includes a second contact surface making contact with the second friction member. The second side plate is disposed on the second side with respect to the second friction member in the axial direction. The second side plate is attached to the first side plate to be unitarily rotated therewith.

According to this configuration, when accumulating on the inner peripheral surface of the first friction member, water can be discharged to the outside through the plurality of first drainage grooves. Because of this, it is made difficult for water to accumulate on the inner peripheral surface of the first friction member, whereby frictional characteristics of the first friction member can be stabilized.

Preferably, each of the plurality of first drainage grooves includes a first outer end portion and a first inner end portion. The first outer end portion is located radially outside, whereas the first inner end portion is located radially inside. The first outer end portion is located radially outside an outer peripheral end of the first friction member. The first inner end portion is located radially inside an inner peripheral end of the first friction member.

An outer peripheral end of the pressure plate can be disposed radially outside the outer peripheral end of the first friction member. On the other hand, an inner peripheral end of the pressure plate can be disposed radially inside the inner peripheral end of the first friction member. The first outer end portion can be disposed radially inside the outer peripheral end of the pressure plate. The first inner end portion can be disposed radially outside the inner peripheral end of the pressure plate.

The plurality of first drainage grooves can extend from the inner peripheral end of the pressure plate to the outer peripheral end thereof.

Preferably, the second side plate includes a plurality of second drainage grooves. The plurality of second drainage grooves are disposed on the second contact surface to be apart from each other at intervals in the circumferential direction. The plurality of second drainage grooves radially extend. According to this configuration, when accumulating on the inner peripheral surface of the second friction member, water can be discharged to the outside through the plurality of second drainage grooves. Because of this, it is made difficult for water to accumulate on the inner peripheral surface of the second friction member, whereby frictional characteristics of the second friction member can be stabilized.

Preferably, each of the plurality of second drainage grooves includes a second outer end portion and a second inner end portion. The second outer end portion is located radially outside, whereas the second inner end portion is located radially inside. The second outer end portion is located radially outside an outer peripheral end of the second friction member. The second inner end portion is located radially inside an inner peripheral end of the second friction member.

Preferably, an outer peripheral end of the second side plate is disposed radially outside the outer peripheral end of the second friction member. An inner peripheral end of the second side plate is disposed radially inside the inner peripheral end of the second friction member. The second outer end portion is disposed radially inside the outer peripheral end of the second side plate. The second inner end portion is disposed radially outside the inner peripheral end of the second side plate.

Overall, according to the present invention, it is made difficult for water to accumulate on the inner peripheral surface of a friction member, whereby frictional characteristics of the friction member can be stabilized.

DETAILED DESCRIPTION

[Entire Configuration]

Figure 1:
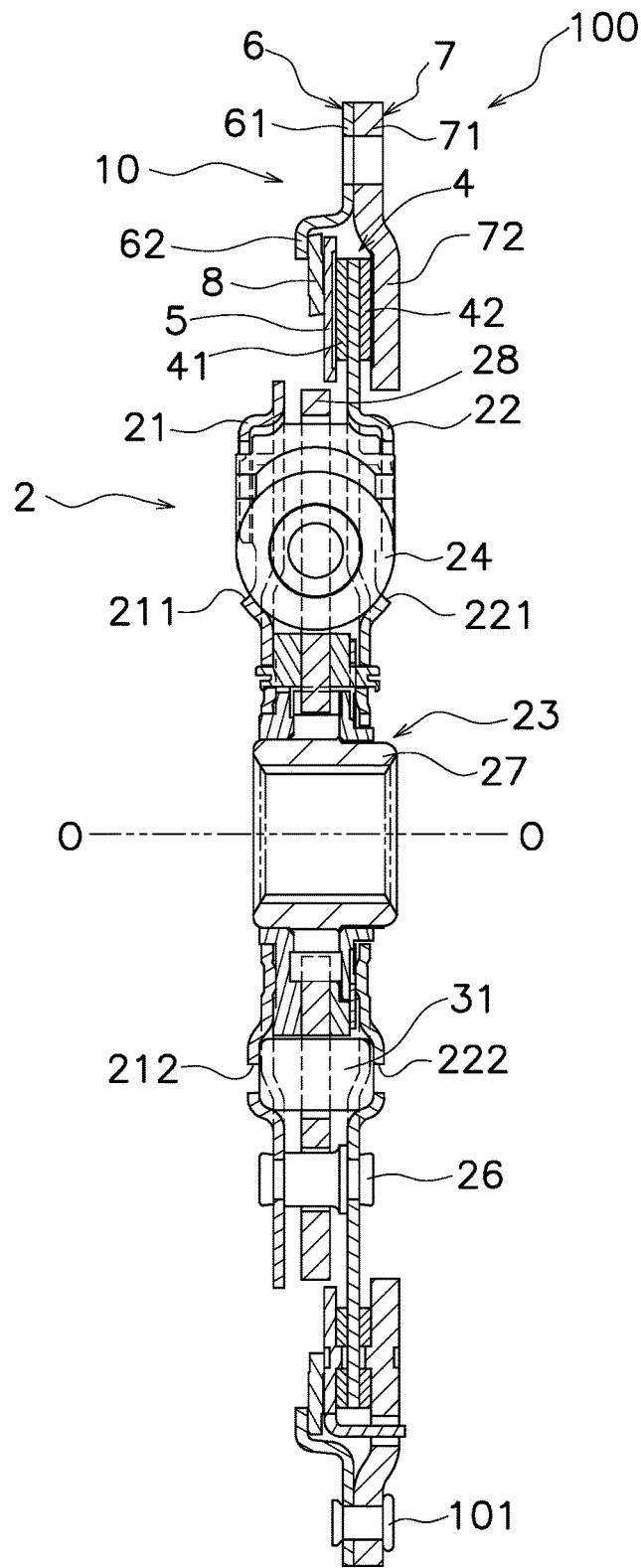
FIG. 1 is a cross-sectional view of a damper device.
Figure 2:
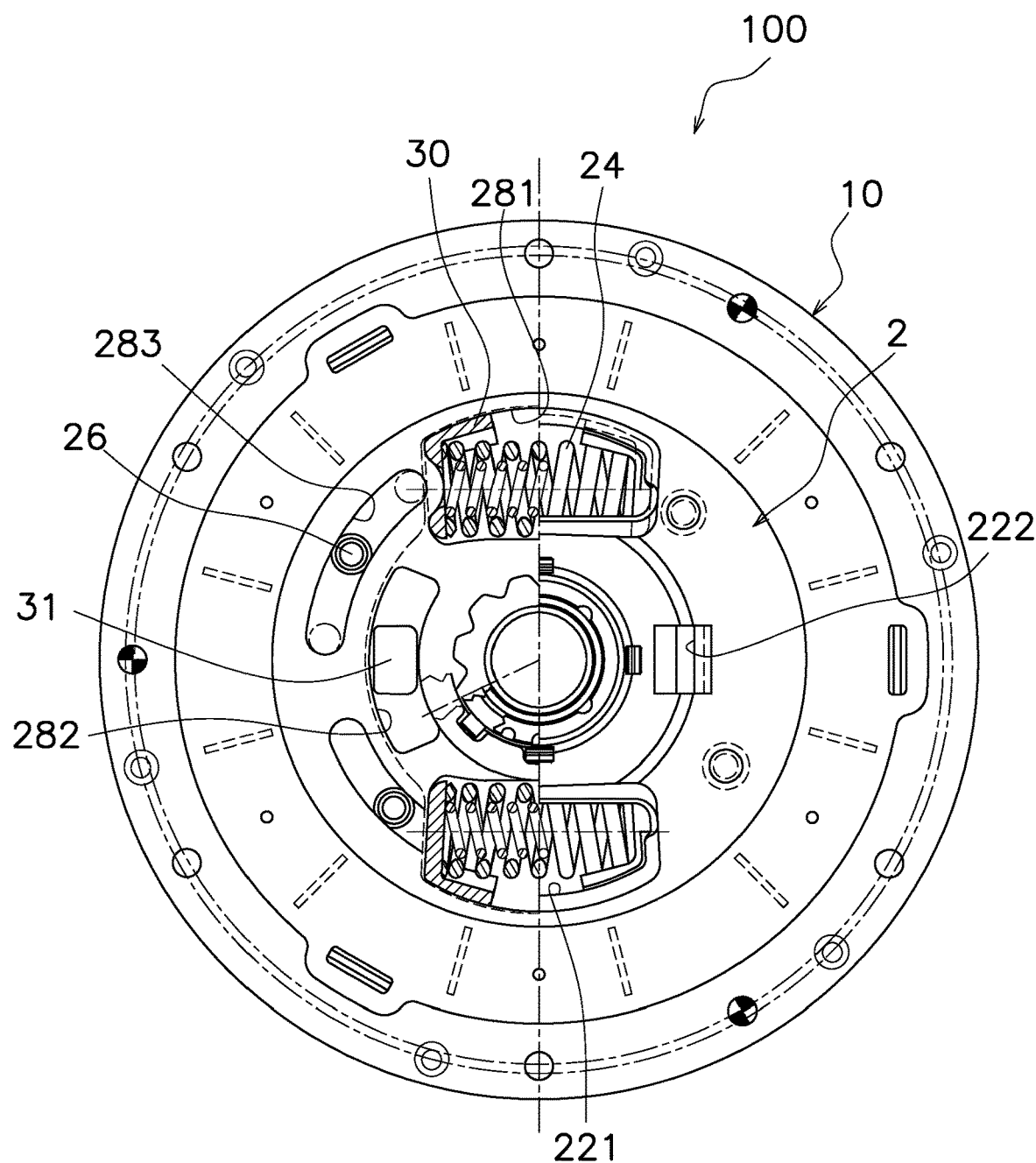
FIG. 2 is a front view of the damper device.

FIG. 1 is a cross-sectional view of a damper device 100 including a torque limiter according to an embodiment of the present invention. On the other hand, FIG. 2 is a front view of the damper device 100 in a condition that some constituent members are detached therefrom or are not illustrated in part. In FIG. 1, an engine is disposed on the right side with respect to the damper device 100, whereas a drive unit, including an electric motor, a transmission, and so forth, is disposed on the left side with respect to the damper device 100.

It should be noted that in the following explanation, the term "axial direction" refers to an extending direction of a rotational axis O of the torque limiter. On the other hand, the term "circumferential direction" refers to a circumferential direction of an imaginary circle about the rotational axis O, whereas the term "radial direction" refers to a radial direction of the imaginary circle about the rotational axis O. Besides, in the present preferred embodiment, the term "first side in the axial direction" refers to the left side in FIG. 1, whereas the term "second side in the axial direction" refers to the right side in FIG. 1.

As shown in FIGS. 1 and 2, the damper device 100 is provided between a flywheel and an input shaft of the drive unit (both of which are not shown in the drawings). Besides, the damper device 100 is configured to limit a torque transmitted between the engine and the drive unit, and simultaneously, attenuate rotational fluctuations. The damper device 100 includes a damper unit 2 and the torque limiter (10).

[Damper Unit 2]

The damper unit 2 is disposed to be rotatable about the rotational axis O of the torque limiter 10. In other words, the rotational axis of the damper unit 2 is arranged coaxial to that of the torque limiter 10. The damper unit 2 includes a first input plate 21, a second input plate 22, a hub flange 23, and a plurality of elastic members 24. The damper unit 2 is configured to attenuate rotational fluctuations.

<First and Second Input Plates 21 and 22>

Each of the first and second input plates 21 and 22 is an annular member having a center hole. The second input plate 22 is disposed on the second side with respect to the first input plate 21 in the axial direction. The second input plate 22 is larger in outer diameter than the first input plate 21. The second input plate 22 is interposed at an outer peripheral end portion thereof between a pair of friction members 41 and 42 to be described.

The first and second input plates 21 and 22 are disposed apart from each other at an interval in the axial direction. The first and second input plates 21 and 22 are fixed to each other by a plurality of stop pins 26. Therefore, the first and second input plates 21 and 22 are unitarily rotated with each other. Besides, the first and second input plates 21 and 22 are immovable relative to each other in the axial direction.

The first input plate 21 includes a plurality of first window portions 211 and a plurality of second window portions 212. It should be noted that in the present preferred embodiment, the first input plate 21 includes a pair of first window portions 211 and a pair of second window portions 212.

The second input plate 22 includes a plurality of third window portions 221 and a plurality of fourth window portions 222. It should be noted that in the present preferred embodiment, the second input plate 22 includes a pair of third window portions 221 and a pair of fourth window portions 222. Each third window portion 221 is configured in similar manner to each first window portion 211 described above, whereas each fourth window portion 222 is configured in similar manner to each second window portion 212 described above.

In an axial view, the third window portions 221 are disposed to overlap the first window portions 211, respectively. Likewise in the axial view, the fourth window portions 222 are disposed to overlap the second window portions 212, respectively.

<Hub Flange 23>

The hub flange 23 is configured to transmit a torque, inputted thereto from the first and second input plates 21 and 22, to an output-side device. The hub flange 23 includes a hub 27 and a flange plate 28 (exemplary output plate). As shown in FIG. 2, the hub 27 and the flange plate 28 are integrated by a plurality of teeth and a plurality of recesses with which the plural teeth are meshed.

The hub 27 is a tubular member disposed within the center holes of the first and second input plates 21 and 22. The hub 27 is provided with a spline hole axially extending in the inner peripheral part thereof. The spline hole enables an output-side member to be spline-coupled thereto.

The flange plate 28 is disposed axially between the first and second input plates 21 and 22. The flange plate 28 includes a plurality of first accommodation holes 281, a plurality of second accommodation holes 282, and a plurality of stopper holes 283. It should be noted that in the present preferred embodiment, the flange plate 28 includes a pair of first accommodation holes 281, a pair of second accommodation holes 282, and four stopper holes 283.

In the axial view, the first accommodation holes 281 are disposed to overlap the first window portions 211 and the third window portions 221, respectively. In the axial view, the second accommodation holes 282 are disposed to overlap the second window portions 212 and the fourth window portions 222, respectively.

The second accommodation holes 282 are disposed radially inside the first accommodation holes 281. Each second accommodation hole 282 is made in shape of a circular arc. Each second accommodation hole 282 is longer in circumferential length than each of the second and fourth window portions 212 and 222.

Each stopper hole 283 is an elongated hole extending in a circular-arc shape. The stopper holes 283 are axially penetrated by the stop pins 26, respectively. Because of this, the first and second input plates 21 and 22 and the flange plate 28 are rotatable relative to each other within a range that each stop pin 26 is movable within each stopper hole 283. In other words, the stop pins 26 and the stopper holes 283 compose a stopper mechanism. The first and second input plates 21 and 22 and the hub flange 23 are prevented from rotating relative to each other when each stop pin 26 makes contact with one of the circumferential end surfaces of each stopper hole 283.

<Elastic Members 24>

The elastic members 24 are configured to elastically couple the first and second input plates 21 and 22 and the flange plate 28 in a rotational direction. The elastic members 24 are, for instance, coil springs.

The elastic members 24 are accommodated in the first accommodation holes 281 of the flange plate 28, respectively. Besides, the elastic members 24 are accommodated in the first window portions 211 of the first input plate 21, respectively, while being accommodated in the third window portions 221 of the second input plate 22, respectively. It should be noted that each elastic member 24 is axially and radially supported by a support part of each first window portion 211 and that of each third window portion 221.

Each elastic member 24 is supported, through a pair of spring seats 30, by both circumferential end surfaces of each first accommodation hole 281, those of each first window portion 211, and those of each third window portion 221. The spring seats 30 are disposed on both circumferential ends of each first accommodation hole 281 of the flange plate 28. The spring seats 30 support the end surfaces of each elastic member 24. Besides, the spring seats 30 support the ends of each elastic member 24 from radially outside.

<Resin Members 31>

Resin members 31 are accommodated in the second accommodation holes 282 of the flange plate 28, respectively. Besides, each resin member 31 is supported by a support part of each second window portion 212 of the first input plate 21 and that of each fourth window portion 222 of the second input plate 22.

It should be noted that each resin member 31 is disposed in each window portion 212, 222 of each first/second input plate 21, 22 without any circumferential gap. On the other hand, each resin member 31 is shorter in circumferential length than each second accommodation hole 282 of the flange plate 28. [Torque Limiter 10]

The torque limiter 10 is disposed radially outside the damper unit 2. The torque limiter 10 is configured to limit a torque transmitted between the flywheel and the damper unit 2.

The torque limiter 10 includes a friction mechanism 4, a pressure plate 5, a first side plate 6, a second side plate 7, and a cone spring 8 (exemplary urging member).

<Friction Mechanism 4>

The friction mechanism 4 includes a first friction member 41 and a second friction member 42. Each of the first and second friction members 41 and 42 has an annular shape. In the present preferred embodiment, the shape of the first friction member 41 and that of the second friction member 42 are identical to each other. The second friction member 42 is disposed on the second side with respect to the first friction member 41 in the axial direction.

The second input plate 22 is disposed at the outer peripheral end portion thereof axially between the first and second friction members 41 and 42. The second input plate 22 is interposed at the outer peripheral end portion thereof between the first and second friction members 41 and 42. The first and second friction members 41 and 42 are in contact with the outer peripheral end portion of the second input plate 22.

The first and second friction members 41 and 42 are rotatable relative to the second input plate 22. Because of this, when a torque having a predetermined value or greater is inputted to the torque limiter 10, the first and second friction members 41 and 42 slide against the second input plate 22, whereby the torque limiter 10 is rotated relative to the second input plate 22. It should be noted that when a torque having less than the predetermined value is inputted to the torque limiter 10, the first and second friction members 41 and 42 are unitarily rotated with the second input plate 22, while being engaged by friction therewith.

<Pressure Plate 5>

The pressure plate 5 has an annular shape. The pressure plate 5 is disposed on the first side with respect to the first friction member 41 in the axial direction.

Figure 3:
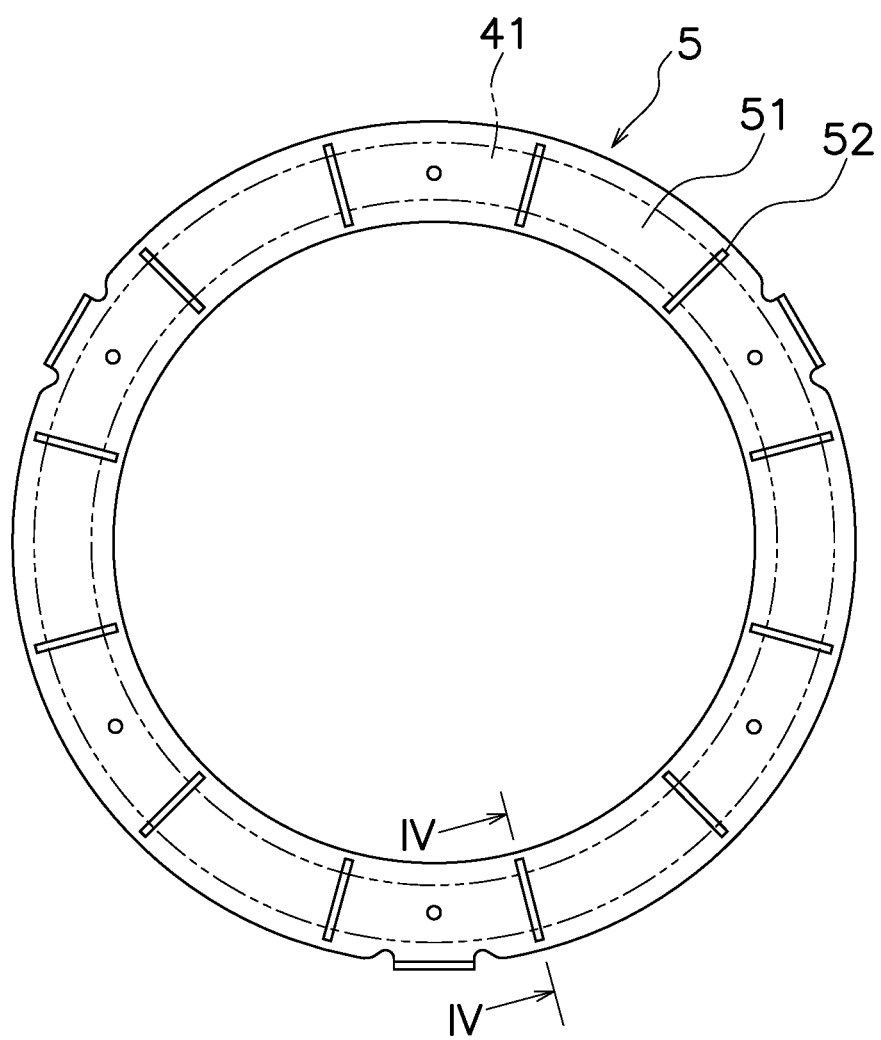
FIG. 3 is a front view of a pressure plate.

As shown in FIG. 3, the pressure plate 5 includes a first contact surface 51 and a plurality of first drainage grooves 52. The first contact surface 51 is made in shape of an annulus extending in the circumferential direction. The first contact surface 51 is a surface making contact with the first friction member 41. In an axial view, the first contact surface 51 overlaps the first friction member 41. It should be noted that the first friction member 41 is fixed to the pressure plate 5, while in contact with the first contact surface 51 of the pressure plate 5. In other words, the first friction member 41 is non-rotatable relative to the pressure plate 5. The first friction member 41 is unitarily rotated with the pressure plate 5.

The first drainage grooves 52 are disposed apart from each other at intervals in the circumferential direction. The first drainage grooves 52 are provided on the first contact surface 51. The first drainage grooves 52 radially extend. The length of each first drainage groove 52 is longer than that from an inner peripheral end 411 to an outer peripheral end 412 of the first friction member 41.

Figure 4:
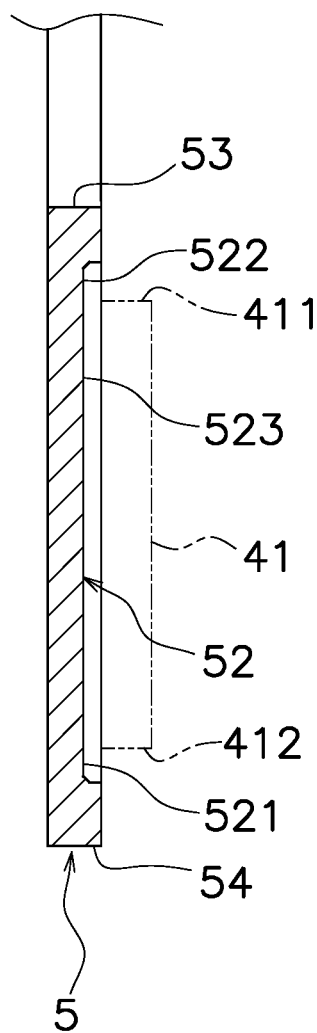
FIG. 4 is a cross-sectional view taken along line IV-IV in FIG. 3.

FIG. 4 is a cross-sectional view taken along line IV-IV in FIG. 3. As shown in FIG. 4, each first drainage groove 52 includes a first outer end portion 521 and a first inner end portion 522. The first outer end portion 521 is one of both end portions, disposed radially outside, in each first drainage groove 52. The first inner end portion 522 is the other of both end portions, disposed radially inside, in each first drainage groove 52.

The first outer end portion 521 is disposed radially outside the outer peripheral end 412 of the first friction member 41. In other words, the first outer end portion 521 does not overlap the first friction member 41 in the axial view. Because of this, the first outer end portion 521 opens in the axial direction. Specifically, the first outer end portion 521 opens to the second side in the axial direction.

The first inner end portion 522 is disposed radially inside the inner peripheral end 411 of the first friction member 41. In other words, the first inner end portion 522 does not overlap the first friction member 41 in the axial view. Because of this, the first inner end portion 522 opens in the axial direction. Specifically, the first inner end portion 522 opens to the second side in the axial direction.

It should be noted that a first middle portion 523, located between the first outer end portion 521 and the first inner end portion 522 in each first drainage groove 52, overlaps the first friction member 41 in the axial view. In other words, the first middle portion 523 of each first drainage groove 52 is covered with the first friction member 41.

With the configurations described above, water accumulating on the inner peripheral surface of the first friction member 41 intrudes into the first drainage grooves 52 from the first inner end portions 522 thereof. After intruding into the first drainage grooves 52, the water is discharged to the outside from the first outer end portions 521 thereof.

Because of this, accumulation of water is inhibited on the inner peripheral surface of the first friction member 41. It should be noted that the first friction member 41 is not provided with any drainage grooves, extending from the inner peripheral end 411 to the outer peripheral end 412, on a surface thereof facing the pressure plate 5, but alternatively, can be provided with such drainage grooves.

The length of the pressure plate 5 from an inner peripheral end 53 thereof to an outer peripheral end 54 thereof is longer than that of the first friction member 41 from the inner peripheral end 411 to the outer peripheral end 412. The outer peripheral end 54 of the pressure plate 5 is disposed radially outside the outer peripheral end 412 of the first friction member 41. On the other hand, the inner peripheral end 53 of the pressure plate 5 is disposed radially inside the inner peripheral end 411 of the first friction member 41.

The length of each first drainage groove 52 is shorter than that of the pressure plate 5 from the inner peripheral end 53 to the outer peripheral end 54. The first outer end portion 521 of each first drainage groove 52 is disposed radially inside the outer peripheral end 54 of the pressure plate 5. The first inner end portion 522 of each first drainage groove 52 is disposed radially outside the inner peripheral end 53 of the pressure plate 5.

As shown in FIG. 1, the pressure plate 5 is disposed such that the inner peripheral surface thereof is not opposed to the outer peripheral surface of the first input plate 21. Because of this, the pressure plate 5 and the first input plate 21 do not interfere with each other.

The outer diameter of the pressure plate 5 is smaller than that of a second side plate 7. The inner diameter of the pressure plate 5 is larger than that of the second side plate 7. Besides, the inner diameter of the pressure plate 5 is smaller than that of the first side plate 6. The plate thickness of the pressure plate 5 is thinner than that of the second side plate 7.

The inner diameter of the pressure plate 5 is equal to the outer diameter of the first input plate 21. Besides, the plate thickness of the pressure plate 5 is equal to that of the first input plate 21. These configurations make it possible to take out the pressure plate 5 and the first input plate 21 from a single plate. Besides, there is no gap radially between the pressure plate 5 and the first input plate 21. In other words, no unnecessary part is produced radially therebetween. Hence, this can contribute to cost reduction.

In a radial view, the pressure plate 5 and the flange plate 28 overlap each other at least in part. The inner peripheral surface of the pressure plate 5 is opposed to the outer peripheral surface of the flange plate 28. Besides, the inner diameter of the pressure plate 5 is larger than the outer diameter of the flange plate 28. Because of this, a gap is produced radially between the inner peripheral surface of the pressure plate 5 and the outer peripheral surface of the flange plate 28.

<Second Side Plate 7>

The second side plate 7 has an annular shape. The second side plate 7 is disposed on the second side with respect to the second friction member 42 in the axial direction. The second side plate 7 includes an outer peripheral portion 71 and an inner peripheral portion 72. The second side plate 7 receives an urging force applied by the cone spring 8 at the inner peripheral portion 72.

Figure 5:
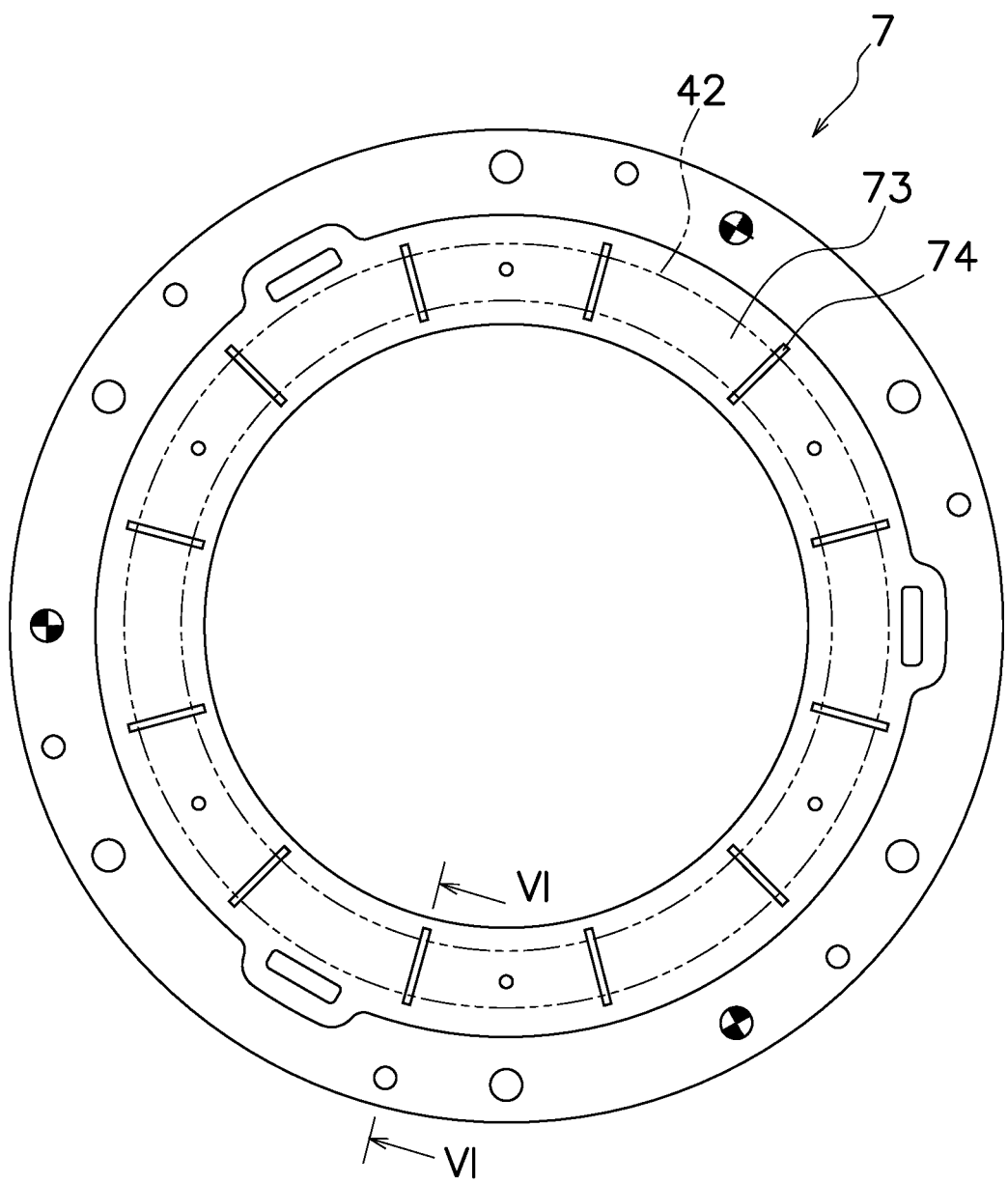
FIG. 5 is a front view of a second side plate.

As shown in FIG. 5, the second side plate 7 includes a second contact surface 73 and a plurality of second drainage grooves 74. The second contact surface 73 is made in shape of an annulus extending in the circumferential direction. The second contact surface 73 is a surface making contact with the second friction member 42. In the axial view, the second contact surface 73 overlaps the second friction member 42.

The second friction member 42 is fixed to the second side plate 7, while in contact with the second contact surface 73 of the second side plate 7. When described in detail, the second friction member 42 is fixed to the inner peripheral portion 72 of the second side plate 7. Because of this, the second friction member 42 is non-rotatable relative to the second side plate 7. The second friction member 42 is unitarily rotated with the second side plate 7.

The second drainage grooves 74 are disposed apart from each other at intervals in the circumferential direction. The second drainage grooves 74 are provided on the second contact surface 73. The second drainage grooves 74 radially extend. The length of each second drainage groove 74 is longer than that of the second friction member 42 from an inner peripheral end 421 thereof to an outer peripheral end 422 thereof.

Figure 6:
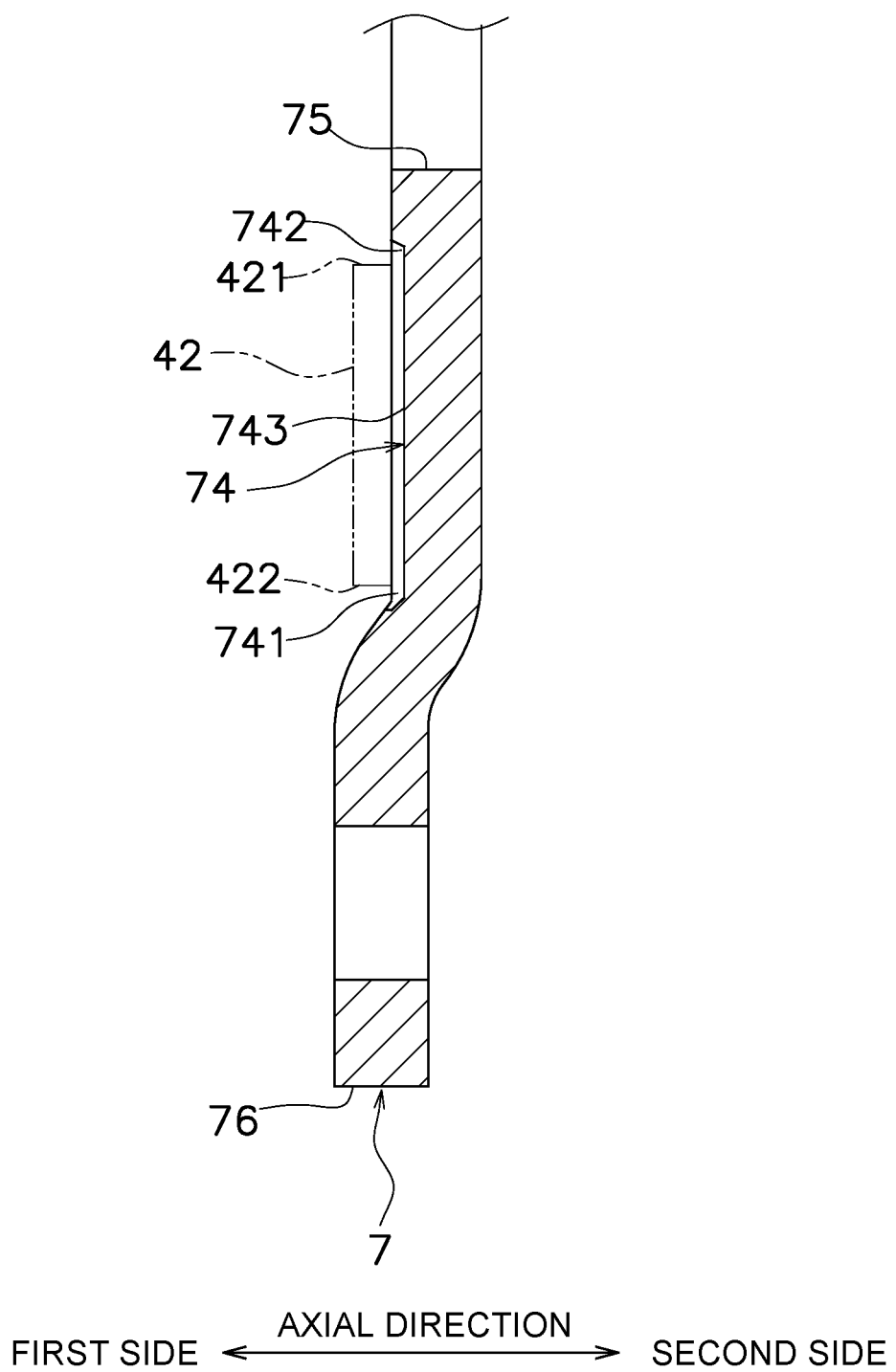
FIG. 6 is a cross-sectional view taken along line VI-VI in FIG. 5.

FIG. 6 is a cross-sectional view taken along line VI-VI in FIG. 5. As shown in FIG. 6, each second drainage groove 74 includes a second outer end portion 741 and a second inner end portion 742. The second outer end portion 741 is one of both end portions, disposed radially outside, in each second drainage groove 74. The second inner end portion 742 is the other of both end portions, disposed radially inside, in each second drainage groove 74.

The second outer end portion 741 is disposed radially outside the outer peripheral end 422 of the second friction member 42. In other words, the second outer end portion 741 does not overlap the second friction member 42 in the axial view. Because of this, the second outer end portion 741 opens in the axial direction. When described in detail, the second outer end portion 741 opens to the first inside in the axial direction.

The second inner end portion 742 is disposed radially inside the inner peripheral end 421 of the second friction member 42. In other words, the second inner end portion 742 does not overlap the second friction member 42 in the axial view. Because of this, the second inner end portion 742 opens in the axial direction. When described in detail, the second inner end portion 742 opens to the first inside in the axial direction.

It should be noted that a second middle portion 743, located between the second outer end portion 741 and the second inner end portion 742 in each second drainage groove 74, overlaps the second friction member 42 in the axial view. In other words, the second middle portion 743 of each second drainage groove 74 is covered with the second friction member 42.

With the configurations described above, water accumulating on the inner peripheral surface of the second friction member 42 intrudes into the second drainage grooves 74 from the second inner end portions 742 thereof. After intruding into the second drainage grooves 74, the water is discharged to the outside from the second outer end portions 741 thereof. Because of this, accumulation of water is inhibited on the inner peripheral surface of the second friction member 42. It should be noted that the second friction member 42 is not provided with any drainage grooves, extending from the inner peripheral end 421 to the outer peripheral end 422, on a surface thereof facing the second side plate 7, but alternatively, can be provided with such drainage grooves.

The length of the second side plate 7 from an inner peripheral end 75 thereof to an outer peripheral end 76 thereof is longer than that of the second friction member 42 from the inner peripheral end 421 to the outer peripheral end 422. The outer peripheral end 76 of the second side plate 7 is disposed radially outside the outer peripheral end 422 of the second friction member 42. On the other hand, the inner peripheral end 75 of the second side plate 7 is disposed radially inside the inner peripheral end 421 of the second friction member 42.

The length of each second drainage groove 74 is shorter than that of the second side plate 7 from the inner peripheral end 75 to the outer peripheral end 76. The second outer end portion 741 of each second drainage groove 74 is disposed radially inside the outer peripheral end 76 of the second side plate 7. The second inner end portion 742 of each second drainage groove 74 is disposed radially outside the inner peripheral end 75 of the second side plate 7.

As shown in FIG. 1, the second side plate 7 is disposed such that the inner peripheral surface thereof is not opposed to the outer peripheral surface of the flange plate 28. Because of this, the second side plate 7 and the flange plate 28 do not interfere with each other. It should be noted that the term "inner peripheral surface" refers to a surface facing radially inward, whereas the term "outer peripheral surface" refers to a surface facing radially outward.

The inner diameter of the second side plate 7 is equal to the outer diameter of the flange plate 28. Besides, the plate thickness of the second side plate 7 is equal to that of the flange plate 28. These configurations make it possible to take out the second side plate 7 and the flange plate 28 from a single plate. Besides, there is no gap radially between the second side plate 7 and the flange plate 28. In other words, no unnecessary part is produced radially therebetween. Hence, this can contribute to cost reduction.

<First Side Plate 6>

The first side plate 6 is disposed on the first side with respect to the pressure plate 5 in the axial direction. The first side plate 6 is fixed to the second side plate 7 by rivets 101 or so forth. Because of this, the first side plate 6 is unitarily rotated with the second side plate 7.

The first side plate 6 has an annular shape. The first side plate 6 is disposed such that the inner peripheral surface thereof is not opposed to the outer peripheral surface of the second input plate 22. Because of this, the first side plate 6 and the second input plate 22 do not interfere with each other.

The outer diameter of the first side plate 6 is approximately equal to that of the second side plate 7. The inner diameter of the first side plate 6 is larger than that of the second side plate 7. The first side plate 6 makes contact at an outer peripheral portion 61 thereof with the outer peripheral portion 71 of the second side plate. On the other hand, the first side plate 6 is disposed, at an inner peripheral portion 62 thereof, axially apart from the second side plate 7 at an interval. The plate thickness of the first side plate 6 is thinner than that of the second side plate 7.

The inner diameter of the first side plate 6 is equal to the outer diameter of the second input plate 22. Besides, the plate thickness of the first side plate 6 is equal to that of the second input plate 22. These configurations make it possible to take out the first side plate 6 and the second input plate 22 from a single plate. Besides, there is no gap radially between the first side plate 6 and the second input plate 22. In other words, no unnecessary part is produced radially therebetween. Hence, this can contribute to cost reduction.

<Cone Spring 8>

The cone spring 8 is disposed axially between the pressure plate 5 and the first side plate 6. The cone spring 8 urges the pressure plate 5 to the second side in the axial direction. In other words, the cone spring 8 urges the pressure plate 5 toward the second side plate 7. The cone spring 8 presses the first friction member 41 toward the second input plate 22 through the pressure plate 5.

The cone spring 8 makes contact at an outer peripheral end portion thereof with the inner peripheral portion 62 of the first side plate 6. The cone spring 8 makes contact at an inner peripheral end portion thereof with the pressure plate 5.

[Action]

A torque, transmitted from the engine to the flywheel, is inputted to the damper unit 2 through the torque limiter 10. In the damper unit 2, the torque is inputted to the first and second input plates 21 and 22 and is then transmitted to the hub flange 23 through the elastic members 24 and the resin members 31. Subsequently, mechanical power is transmitted from the hub flange 23 to the electric motor, the transmission, a power generator, and so forth that are disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter 10.

[Modifications]

The present invention is not limited to the preferred embodiment described above and a variety of changes or modifications can be made without departing from the scope of the present invention.

Figure 7:
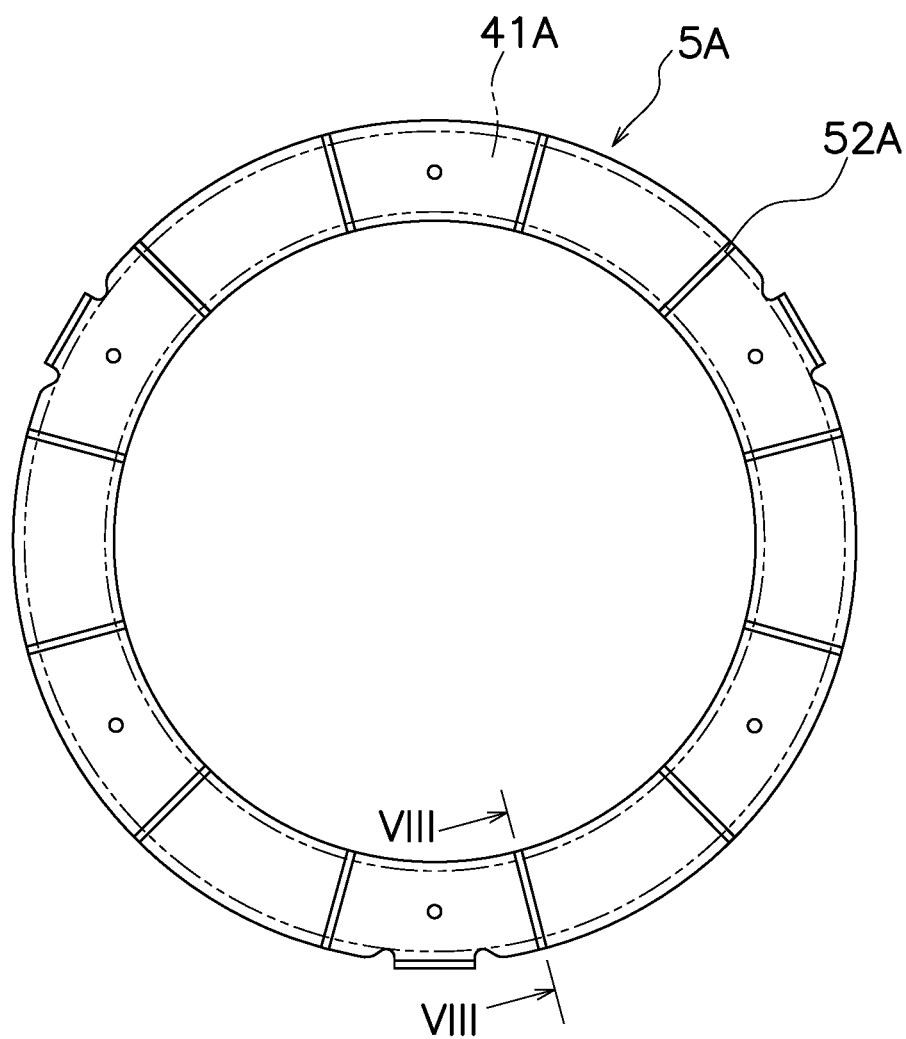
FIG. 7 is a front view of a pressure plate according to a modification.
Figure 8:
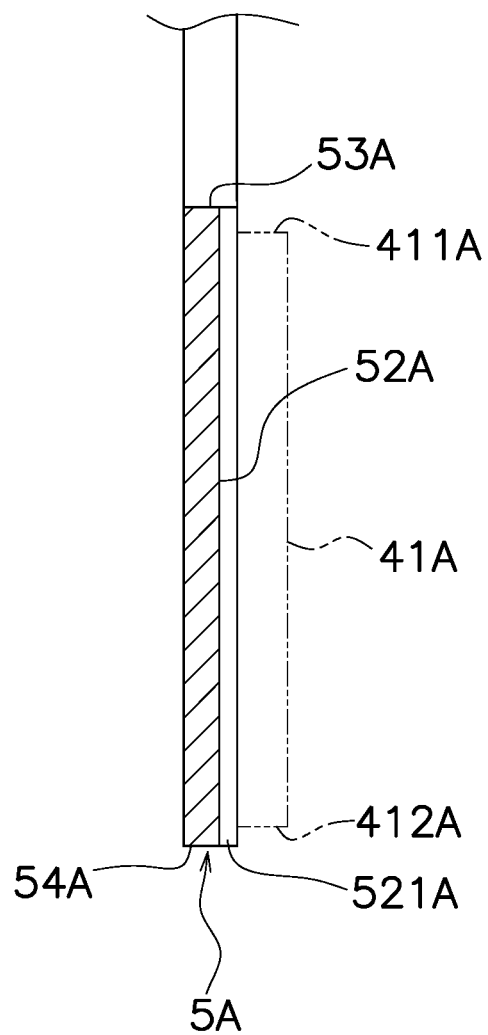
FIG. 8 is a cross-sectional view taken along line VIII-VIII in FIG. 7.

(a) In the preferred embodiment described above, the length of each first drainage groove 52 is shorter than that of the pressure plate 5 from the inner peripheral end 53 to the outer peripheral end 54. However, the configuration of each first drainage groove 52 is not limited to this. For example, as shown in FIGS. 7 and 8, first drainage grooves 52A can be provided to extend from an inner peripheral end 53A to an outer peripheral end 54A on a pressure plate 5A. In other words, the length of each first drainage groove 52A can be equal to that of the pressure plate 5A from the inner peripheral end 53A to the outer peripheral end 54A.

In this case, the area of a first friction member 41A can be made larger than that of the first friction member 41 in the preferred embodiment described above. For example, a radial position of an outer peripheral end 412A of the first friction member 41A can be made identical to that of the outer peripheral end 54A of the pressure plate 5A. In this case, a first outer end portion 521A of each first drainage groove 52A opens radially outward.

(b) In the preferred embodiment described above, the first friction member 41 is fixed to the pressure plate 5. However, the configuration of the torque limiter 10 is not limited to this. For example, the first friction member 41 can be fixed to the outer peripheral end portion of the second input plate 22. In other words, the first friction member 41 can be engaged by friction with the first contact surface 51 of the pressure plate 5.

(c) In the preferred embodiment described above, the second friction member 42 is fixed to the second side plate 7. However, the configuration of the torque limiter 10 is not limited to this. For example, the second friction member 42 can be fixed to the outer peripheral end portion of the second input plate 22. In other words, the second friction member 42 can be engaged by friction with the second contact surface 73 of the second side plate 7.

(d) In the preferred embodiment described above, the second side plate 7 is provided with the second drainage grooves 74. However, the configuration of the second side plate 7 is not limited to this. In other words, the second side plate 7 may not be provided with the second drainage grooves 74. In this case, for instance, the second friction member 42 is preferably provided with drainage grooves. When described in detail, the second friction member 42 is preferably provided with drainage grooves on a surface thereof making contact with the second side plate 7.

(e) In the preferred embodiment described above, the torque limiter 10 composes part of the damper device 100. However, the configuration of the torque limiter 10 is not particularly limited to this. For example, the torque limiter 10 can be attached, not to the damper unit, but to another member.

REFERENCE SIGNS LIST

4: Friction mechanism
41: First friction member
411: Inner peripheral end
412: Outer peripheral end
42: Second friction member
421: Inner peripheral end
422: Outer peripheral end
5: Pressure plate
51: First contact surface
52: First drainage groove
521: First outer end portion
522: First inner end portion
53: Inner peripheral end
54: Outer peripheral end
6: First side plate
7: Second side plate
73: Second contact surface
74: Second drainage groove
741: Second outer end portion
742: Second inner end portion
75: Inner peripheral end
76: Outer peripheral end
8: Cone spring
10: Torque limiter

What is claimed is:

1. A torque limiter comprising:
a friction mechanism including a first friction member and a second friction member, the first friction member having an annular shape, the second friction member having an annular shape, the second friction member disposed on a second side with respect to the first friction member in an axial direction;
a pressure plate having an annular shape, the pressure plate disposed on a first side with respect to the first friction member in the axial direction, the pressure plate including a first contact surface and a plurality of first drainage grooves, the first contact surface making contact with the first friction member, the plurality of first drainage grooves disposed on the first contact surface to be apart from each other at intervals in a circumferential direction, the plurality of first drainage grooves radially extending;
a first side plate disposed on the first side with respect to the pressure plate in the axial direction;
an urging member disposed between the pressure plate and the first side plate, the urging member configured to urge the pressure plate to the second side in the axial direction; and
a second side plate disposed on the second side with respect to the second friction member in the axial direction, the second side plate attached to the first side plate to be unitarily rotated therewith, the second side plate including a second contact surface, the second contact surface making contact with the second friction member;
wherein each of the plurality of first drainage grooves includes a first outer end portion and a first inner end portion,
the first outer end portion is located radially outside an outer peripheral end of the first friction member, and
the first inner end portion is located radially inside an inner peripheral end of the first friction member.

2. The torque limiter according to claim 1, wherein
an outer peripheral end of the pressure plate is disposed radially outside the outer peripheral end of the first friction member,
an inner peripheral end of the pressure plate is disposed radially inside the inner peripheral end of the first friction member,
the first outer end portion is disposed radially inside the outer peripheral end of the pressure plate, and
the first inner end portion is disposed radially outside the inner peripheral end of the pressure plate.

3. A torque limiter comprising:
a friction mechanism including a first friction member and a second friction member, the first friction member having an annular shape, the second friction member having an annular shape, the second friction member disposed on a second side with respect to the first friction member in an axial direction;
a pressure plate having an annular shape, the pressure plate disposed on a first side with respect to the first friction member in the axial direction, the pressure plate including a first contact surface and a plurality of first drainage grooves, the first contact surface making contact with the first friction member, the plurality of first drainage grooves disposed on the first contact surface to be apart from each other at intervals in a circumferential direction, the plurality of first drainage grooves radially extending;
a first side plate disposed on the first side with respect to the pressure plate in the axial direction;
an urging member disposed between the pressure plate and the first side plate, the urging member configured to urge the pressure plate to the second side in the axial direction; and
a second side plate disposed on the second side with respect to the second friction member in the axial direction, the second side plate attached to the first side plate to be unitarily rotated therewith, the second side plate including a second contact surface, the second contact surface making contact with the second friction member;
wherein the second side plate includes a plurality of second drainage grooves, the plurality of second drainage grooves disposed on the second contact surface to be apart from each other at intervals in the circumferential direction, the plurality of second drainage grooves radially extending,
each of the plurality of second drainage grooves includes a second outer end portion and a second inner end portion,
the second outer end portion is located radially outside an outer peripheral end of the second friction member, and
the second inner end portion is located radially inside an inner peripheral end of the second friction member.

4. The torque limiter according to claim 3, wherein
- an outer peripheral end of the second side plate is disposed radially outside the outer peripheral end of the second friction member,
- an inner peripheral end of the second side plate is disposed radially inside the inner peripheral end of the second friction member,
- the second outer end portion is disposed radially inside the outer peripheral end of the second side plate, and
- the second inner end portion is disposed radially outside the inner peripheral end of the second side plate.

* * * * *